United States Patent
Ishino

(10) Patent No.: US 11,233,919 B2
(45) Date of Patent: Jan. 25, 2022

(54) INFORMATION PROCESSING SYSTEM, INFORMATION PROCESSING APPARATUS, AND NON-TRANSITORY COMPUTER READABLE MEDIUM STORING PROGRAM FOR TRANSMITTING DATA IN A STATE WHERE INDIVIDUAL IS NOT SPECIFIED

(71) Applicant: FUJIFILM Business Innovation Corp., Tokyo (JP)

(72) Inventor: Shigeki Ishino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 170 days.

(21) Appl. No.: 16/352,809

(22) Filed: Mar. 13, 2019

(65) Prior Publication Data
US 2019/0297222 A1    Sep. 26, 2019

(30) Foreign Application Priority Data

Mar. 22, 2018    (JP) ............................. JP2018-053734

(51) Int. Cl.
*G06F 3/12*    (2006.01)
*H04N 1/32*    (2006.01)
*H04N 1/44*    (2006.01)

(52) U.S. Cl.
CPC ....... *H04N 1/32406* (2013.01); *H04N 1/4406* (2013.01); *H04N 2201/0094* (2013.01); *H04N 2201/3298* (2013.01)

(58) Field of Classification Search
CPC ............ H04N 1/32406; H04N 1/4406; H04N 2201/0094; H04N 2201/3298
USPC ......................................... 358/1.1–1.18, 402
See application file for complete search history.

(56) References Cited

U.S. PATENT DOCUMENTS

| 5,956,154 A * | 9/1999 | Cairo ....................... H04N 1/00 358/434 |
| 2009/0150988 A1 * | 6/2009 | Love ....................... G06F 21/33 726/10 |
| 2011/0202981 A1 * | 8/2011 | Tamai ................... G06F 21/305 726/6 |
| 2016/0027009 A1 * | 1/2016 | Sivashanmugam .. G06Q 20/202 705/21 |
| 2017/0063607 A1 | 3/2017 | Maruyama |

FOREIGN PATENT DOCUMENTS

JP    2017-045099    3/2017

* cited by examiner

*Primary Examiner* — Gabriel I Garcia
(74) *Attorney, Agent, or Firm* — JCIPRNET

(57) ABSTRACT

An information processing system includes an adding unit that in a case where first data acquired in a state without individual authentication is stored in a storage area associated with a specific individual, adds information for specifying an individual to the first data to obtain second data; and a transmission unit that transmits the first data to a specific destination requiring individual authentication, using authentication information associated with the information for specifying an individual, which is acquired in advance from the specific destination.

17 Claims, 19 Drawing Sheets

FIG. 10
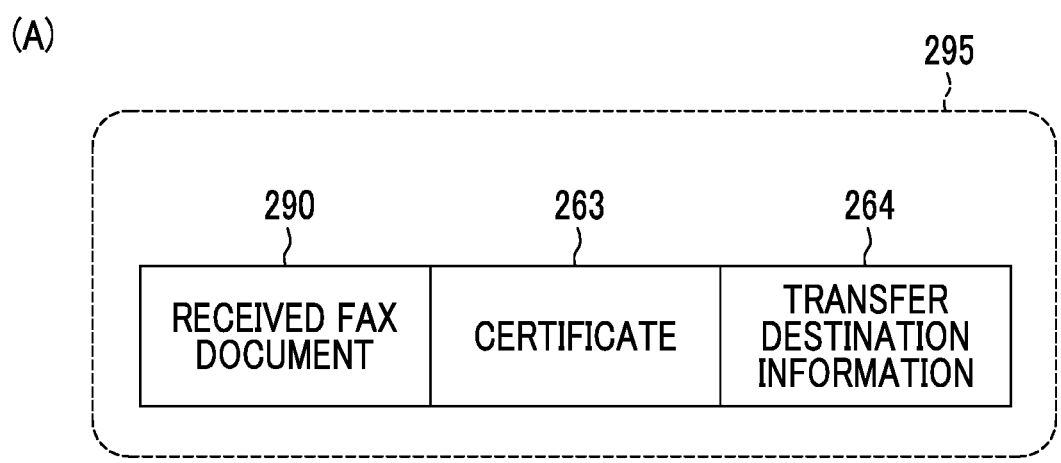
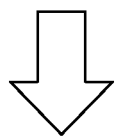
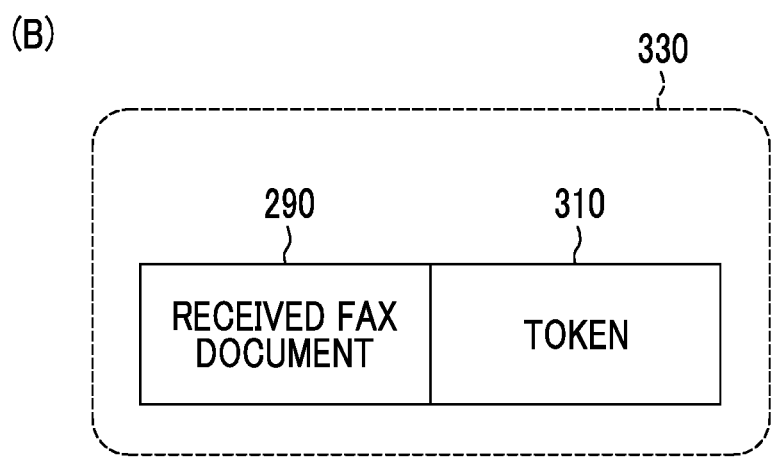

INFORMATION PROCESSING SYSTEM, INFORMATION PROCESSING APPARATUS, AND NON-TRANSITORY COMPUTER READABLE MEDIUM STORING PROGRAM FOR TRANSMITTING DATA IN A STATE WHERE INDIVIDUAL IS NOT SPECIFIED

CROSS-REFERENCE TO RELATED APPLICATIONS

This application is based on and claims priority under 35 USC 119 from Japanese Patent Application No. 2018-053734 filed Mar. 22, 2018.

BACKGROUND

(i) Technical Field

The present invention relates to an information processing system, an information processing apparatus, and a non-transitory computer readable medium storing a program.

(ii) Related Art

There is a service of storing data (for example, data read by a scanner) acquired by a logged-in user's operation on the cloud. In this service, the connection with the cloud is executed using the authentication information associated with the logged-in user.

SUMMARY

Data generated in a state where an individual is not specified may not be transmitted to a communication destination requiring specification of an individual.

Aspects of non-limiting embodiments of the present disclosure relate to an information processing system, an information processing apparatus, and a non-transitory computer readable medium storing a program, enabling transmission to a communication destination requiring specification of an individual even in a case where data to be transmitted is acquired in a state where an individual is not specified.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing system including an adding unit that in a case where first data acquired in a state without individual authentication is stored in a storage area associated with a specific individual, adds information for specifying an individual to the first data to obtain second data; and a transmission unit that transmits the first data to a specific destination requiring individual authentication, using authentication information associated with the information for specifying an individual, which is acquired in advance from the specific destination.

BRIEF DESCRIPTION OF THE DRAWINGS

Exemplary embodiment(s) of the present invention will be described in detail based on the following figures, wherein:

FIG. 6A illustrates a received FAX document to be transmitted, and FIG. 6B illustrates an example of transmission data generated by the certificate adding section;

FIG. 10 is a diagram for explaining the contents of a process by a token adding section, a part (A) of FIG. 10 illustrates transmission data received by the relay device, and a part (B) of FIG. 10 is an example of transmission data generated by the token adding section;

DETAILED DESCRIPTION

Hereinafter, exemplary embodiments of the present invention will be described with reference to the drawings.

Exemplary Embodiment 1

System Configuration

Figure 1:
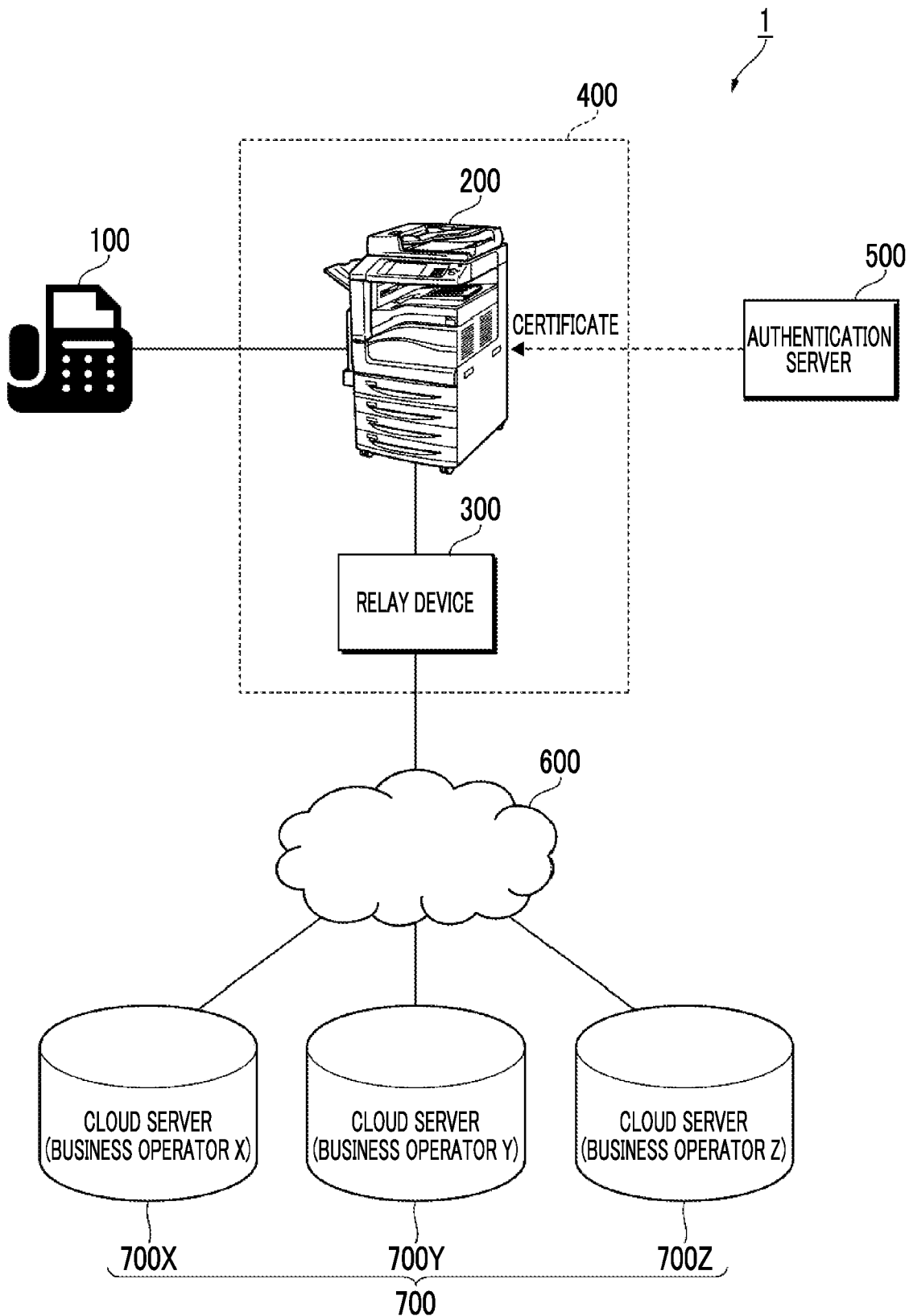
FIG. 1 is a diagram illustrating a configuration example of a cloud cooperation system according to Exemplary Embodiment 1.

FIG. 1 is a diagram illustrating a configuration example of a cloud cooperation system 1 according to Exemplary Embodiment 1.

The cloud cooperation system 1 includes a facsimile 100 that transmits and receives facsimile (FAX) documents through a communication network, an image forming apparatus 200 that forms an image on a recording material (for example, paper), a relay device 300 that realizes the user of a cloud service in cooperation with the image forming apparatus 200, a network cloud 600, and a cloud server 700 managed by a cloud provider.

The image forming apparatus 200 according to the present exemplary embodiment includes, in addition to a FAX function for transmitting and receiving FAX documents, a copy function for generating copies, a scanning function for reading images of documents, a printing function for printing images on paper, and the like.

In the case of the present exemplary embodiment, the FAX document is used in the meaning of a document of a photograph, a character, a figure, or the like transmitted and received by the facsimile 100. The FAX document is an example of image data.

The relay device 300 in the present exemplary embodiment is connected to the network cloud 600 and provides a function of transferring the FAX document received by the image forming apparatus 200 to the cloud server 700.

In the present exemplary embodiment, a system including the image forming apparatus 200 and the relay device 300 is referred to as an information processing system 400.

The image forming apparatus 200 and the relay device 300 are both examples of the information processing apparatus.

However, the image forming apparatus 200 also functions as an example of an adding unit constituting the information processing system 400. In addition, the relay device 300 also functions as an example of a transmission unit constituting the information processing system 400.

An authentication server 500 is connected to the image forming apparatus 200 illustrated in FIG. 1.

The authentication server 500 is an example of an external apparatus that generates a certificate certifying that an instruction form to be described later is created by a specific individual user. The certificate is also used for certifying that the FAX document to be transmitted to the relay device 300 belongs to the specific individual user.

A cloud server 700 that provides storage services on the cloud is connected to the network cloud 600.

In FIG. 1, three cloud servers 700, namely, a cloud server 700X operated by a business operator X providing a storage service, a cloud server 700Y operated by a business operator Y, and a cloud server 700Z operated by a business operator Z are illustrated as the cloud servers 700.

Here, individual authentication is required for connection to the cloud servers 700X, 700Y, and 700Z. That is, the cloud servers 700X, 700Y, and 700Z are examples of specific destinations requiring individual authentication.

Hardware Configuration of Image Forming Apparatus 200

Figure 2:
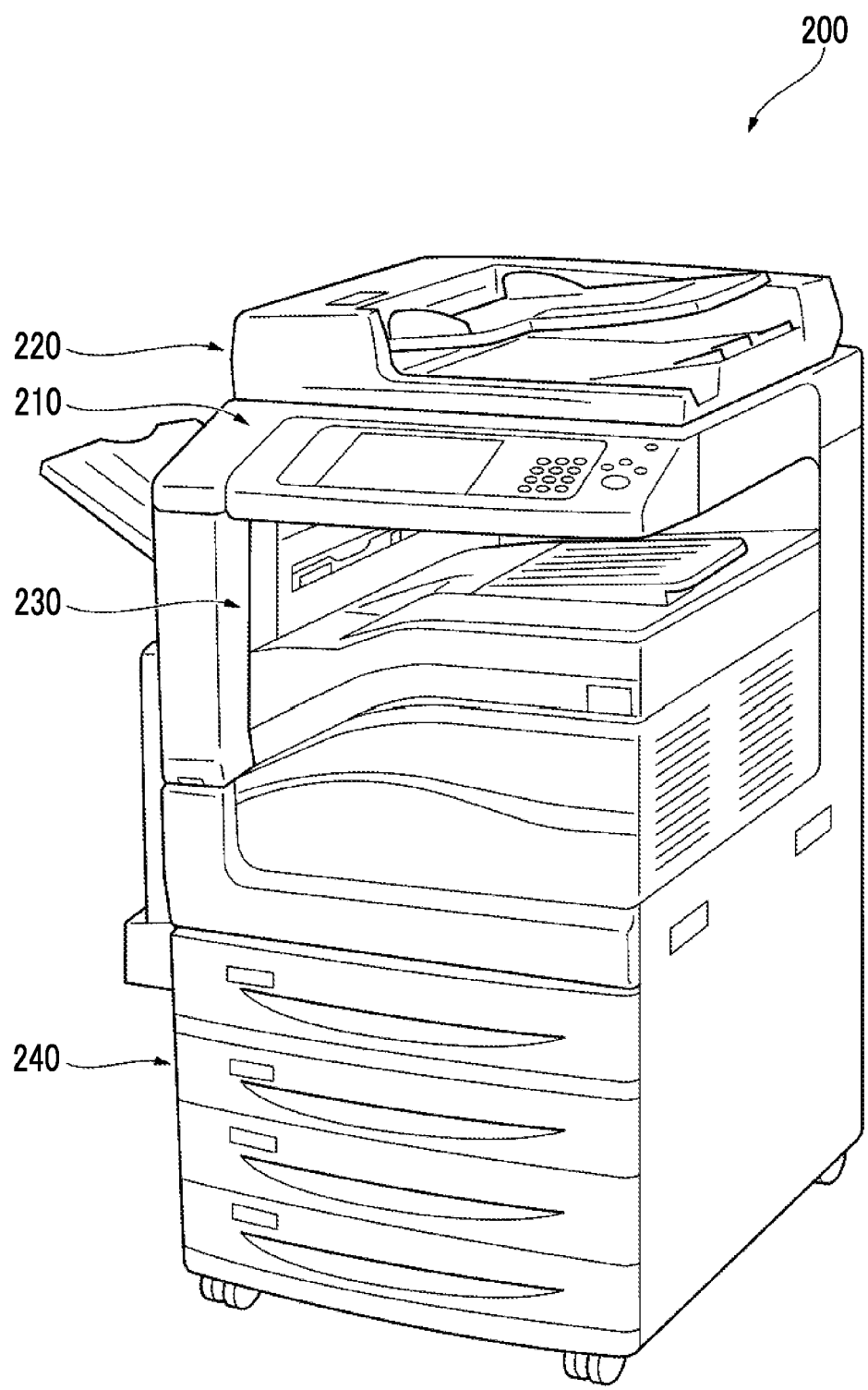
FIG. 2 is a diagram illustrating an example of an external configuration of an image forming apparatus according to the exemplary embodiment.

FIG. 2 is a diagram illustrating an example of an external configuration of the image forming apparatus 200 according to the exemplary embodiment.

The image forming apparatus 200 illustrated in FIG. 2 includes a user interface unit 210 used for receiving operations and presenting various types of information, an image reading unit 220 that reads an image from a document, an image forming unit 230 that records an image on paper, and an accommodating portion 240 that accommodates sheets of paper.

The user interface unit 210 includes an operation receiving section that receives instructions from the user, and a display section that provides information to the user.

The image reading unit 220 includes an image reading section that optically reads an image formed on a document and a document transport section that transports the document to the image reading section.

The image forming unit 230 includes an image forming section that forms an image on a sheet by an electrophotographic method or an inkjet method, a sheet supplying section that supplies a sheet to the image forming section, a sheet discharging unit that discharges a sheet on which an image is formed, a reversing transport section that reverses the front and back of a sheet and guides the sheet to the image forming section, and the like.

Figure 3:
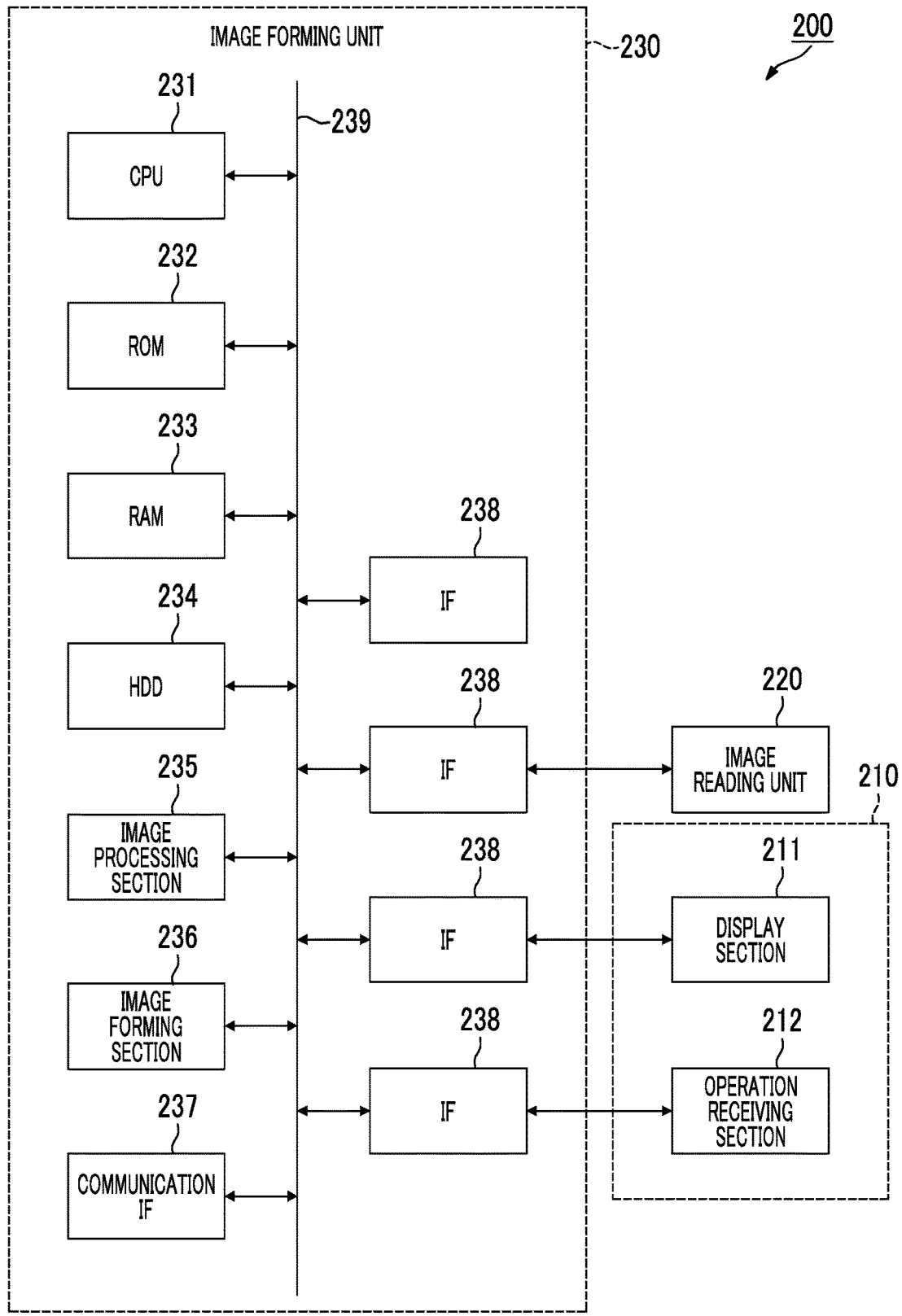
FIG. 3 is a diagram illustrating an example of a hardware configuration of an image forming unit.

FIG. 3 is a diagram illustrating an example of a hardware configuration of the image forming unit 230.

The image forming unit 230 is connected to the user interface unit 210 and the image reading unit 220 through an interface 238.

Here, the user interface unit 210 includes a display section 211 that displays a user interface screen, and an operation receiving section 212 that receives a user's operation.

The image forming unit 230 includes a central processing unit (CPU) 231 that controls the entire apparatus by executing a program (including firmware), a ROM 232 that stores programs such as a basic input output system (BIOS) and firmware, a random access memory (RAM) 233 used as a program execution area.

In addition, the image forming unit 230 includes a hard disk device (HDD) 234 that stores image data, management data, and the like, an image processing section 235 that performs an image process such as color correction and gradation correction on the image data, an image forming section 236 that forms an image on paper by an electrophotographic method or an inkjet method, for example, and a communication interface (communication IF) 237 used for communication with the outside.

These sections are connected to each other through a bus 239, and data is exchanged through the bus 239.

Figure 4:
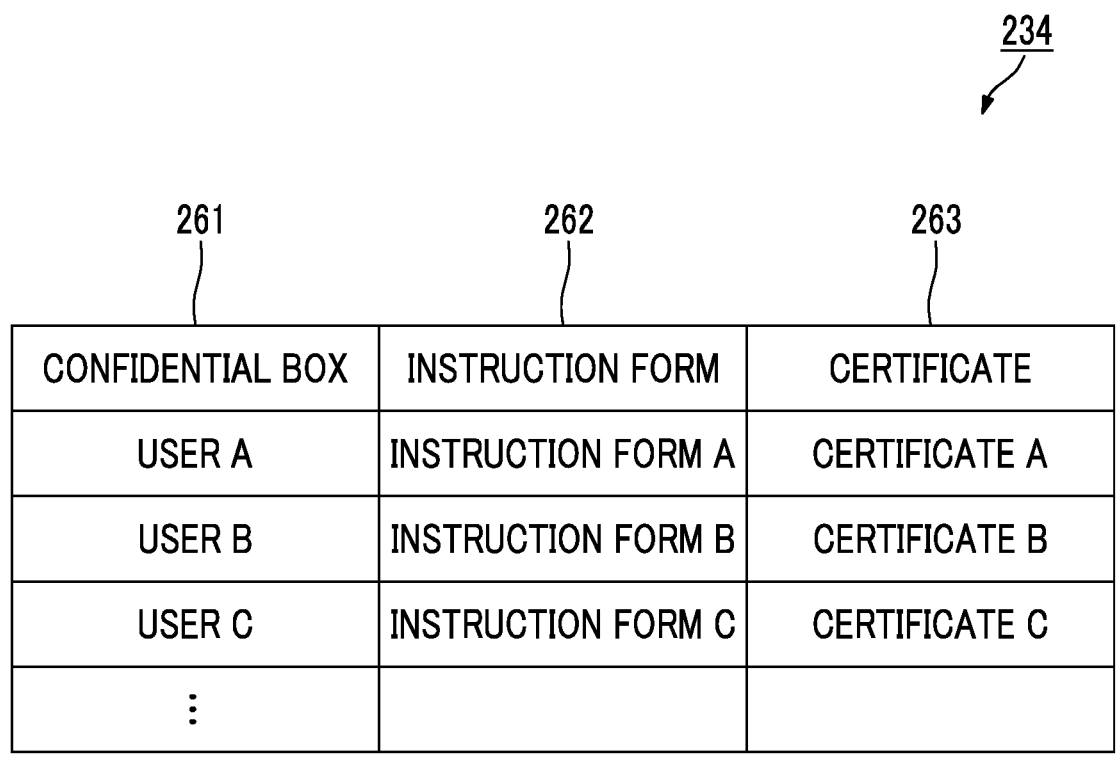
FIG. 4 is a diagram for explaining an example of a use of a storage area of a hard disk device.

FIG. 4 is a diagram for explaining an example of a use of a storage area of the hard disk device 234.

In the image forming apparatus 200 (see FIG. 1) according to the present exemplary embodiment, a function for utilizing a part of the storage area of the hard disk device 234 as a post-office box is prepared.

In the present exemplary embodiment, this function is called a confidential box function, and the area secured in the hard disk device 234 is called a confidential box 261.

The confidential box 261 is an example of a storage area associated with a specific individual. In the case of FIG. 4, the confidential boxes 261 are prepared for three users, that is, a user A, a user B, and a user C. Of course, any number of confidential boxes 261 are used.

In the case of the present exemplary embodiment, the confidential box 261 is associated with an individual user who is authorized to use it. Therefore, the data stored in the confidential box 261 may not be seen by any person other than the associated individual person.

In the present exemplary embodiment, the confidential box 261 stores the received FAX document in a state without individual authentication. However, scanned images or FAX documents received in a state where an individual is authenticated can also be recorded in the confidential box 261 according to the present exemplary embodiment.

In the present exemplary embodiment, the FAX document received from the facsimile 100 is referred to as a received FAX document. The reception of the FAX document does not require the operation of the individual user. Therefore, the received FAX document is generated in a state without individual authentication. Therefore, the received FAX document is an example of first data.

In the case of the present exemplary embodiment, in the confidential box 261, an instruction form 262 describing a process to be executed in a case where a received FAX document is stored and a certificate 263 indicating that data stored in the confidential box 261 is owned by a specific individual user are stored in association with each other.

The certificate 263 is generated in advance by the external authentication server 500 (see FIG. 1), and is associated with the confidential box 261.

The authentication server 500 according to the present exemplary embodiment generates the certificate 263 based on the authentication information of the individual user who is authorized to use the confidential box 261 and the description of the corresponding instruction form 262. The certificate 263 is an example of a virtual account.

In a case where a received FAX document is stored in the confidential box 261, the instruction form 262 in the present exemplary embodiment describes that a specific cloud server is designated as a transfer destination and the received FAX document is to be transmitted to the relay device 300.

Since the writer of the instruction form 262 is an individual user associated with the confidential box 261, it is possible for the individual user to designate the transfer destination freely.

The certificate 263 is used for certifying the validity of the instruction form 262 as information for specifying the individual user authorized to use the confidential box 261, and for specifying the owner of the received FAX document stored in the confidential box 261.

Functional Configuration of Image Forming Apparatus 200

Figure 5:
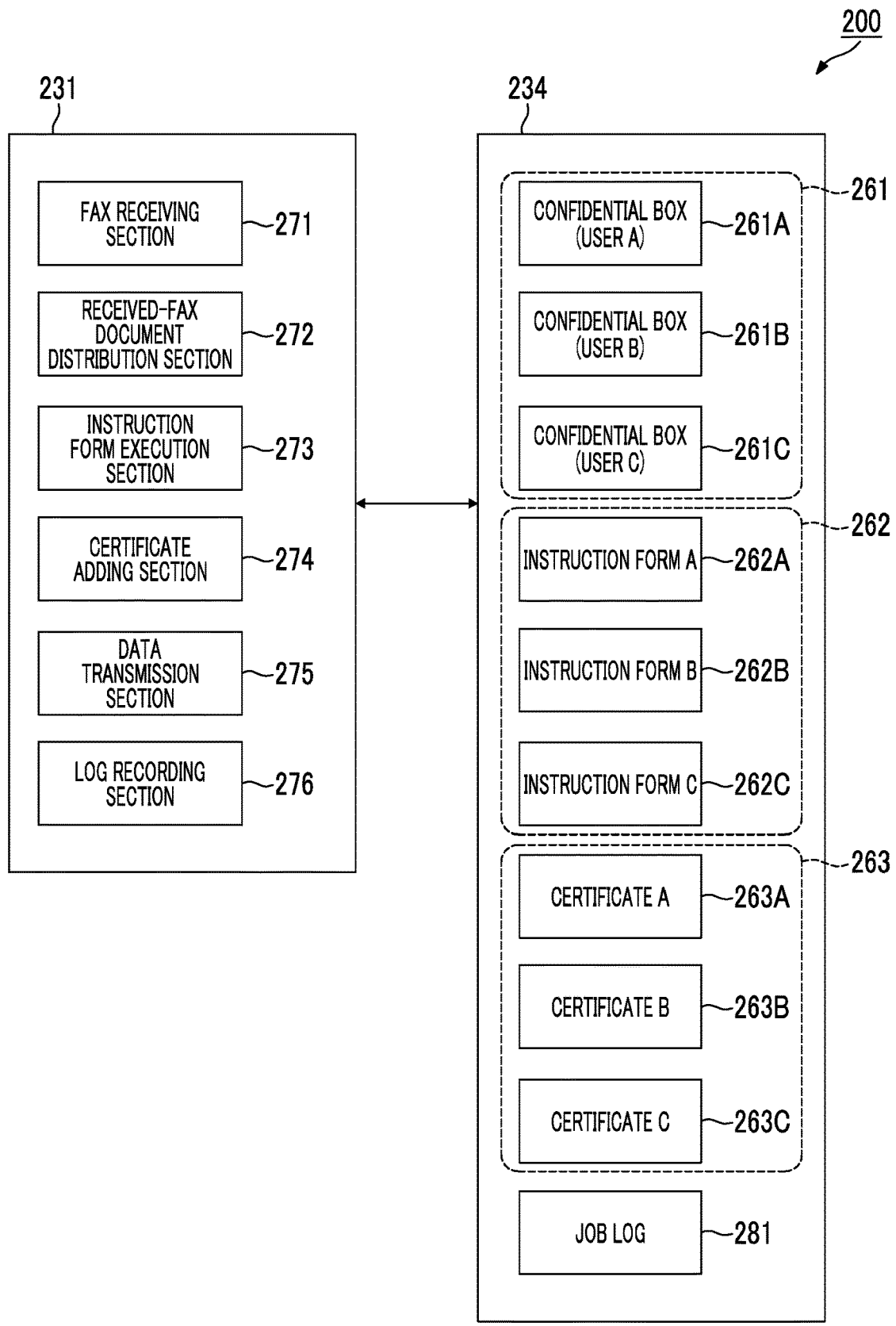
FIG. 5 is a diagram illustrating an example of a functional configuration of the image forming apparatus according to the exemplary embodiment.

FIG. 5 is a diagram illustrating an example of a functional configuration of the image forming apparatus 200 according to the exemplary embodiment.

The functions shown in FIG. 5 are realized by the CPU 231 executing a program.

In addition, FIG. 5 illustrates some functions necessary for cooperation with the relay device 300 (see FIG. 1) among the functions realized through the execution of the program.

The image forming apparatus 200 includes a FAX receiving section 271 that receives a FAX document from the facsimile 100 (see FIG. 1), a received-FAX document distribution section 272 that distributes the received FAX document (reception FAX document) into the corresponding confidential box 261 (261A to 261C), an instruction form execution section 273 that executes the instruction form 262 (262A to 262C) associated with the confidential box 261, a certificate adding section 274 that adds a certificate 263 (263A to 263C) to the received FAX document which is transmitted to the relay device 300 (FIG. 1), a data transmission section 275 that transmits the received FAX document to which the certificate 263 is added, to relay device 300, and a log recording section 276 that records the transmission of data as an operation of the corresponding individual user.

Incidentally, the confidential box 261A is an area dedicated to the user A, and only the user A has authority to use it. The confidential box 261B is an area dedicated to the user B, and only the user B has authority to use it. The confidential box 261C is an area dedicated to the user C, and only the user C has authority to use it.

The instruction form 262A is information for defining a process to be executed in a case where the received FAX document is stored in the confidential box 261A, and is created by the user A. The instruction form 262B is information for defining a process to be executed in a case where the received FAX document is stored in the confidential box 261B, and is created by the user B. The instruction form 262C is information for defining a process to be executed in a case where the received FAX document is stored in the confidential box 261C, and is created by the user C.

The certificate 263A is information for specifying the user A associated with the confidential box 261A, the certificate 263B is information for specifying the user B associated with the confidential box 261B, the certificate 263C is information for specifying the user C associated with the confidential box 261C.

In addition, a job log 281 is stored in the hard disk device 234.

In the case of the present exemplary embodiment, the received-FAX document distribution section 272 uses, for example, information (number, identifier (ID), or the like) for specifying the transmission destination of the received FAX document, and determines a confidential box 261 to be a distribution destination (or classification destination) according to a predetermined rule.

For example, in a case where a dial-in number is attached to each user, the received-FAX document distribution section 272 stores the received FAX document in the confidential box 261 of the user individual corresponding to the dial-in number. In addition to this, for distribution to the confidential box 261, a calling telephone number, a telephone number for remote control, a FAX number (G3 ID) or the like can also be used.

In a case where a new received FAX document is stored in the confidential box 261, the instruction form execution section 273 reads out and executes the instruction form 262 associated with the stored confidential box 261. As described above, the instruction form 262 describes that the received FAX document is to be transmitted to a specific cloud storage through the relay device 300 (see FIG. 1).

The certificate adding section 274 adds the related instruction form 262 to the received FAX document transmitted to the relay device 300. The certificate adding section 274 functions as an example of an adding unit.

Figure 6A:
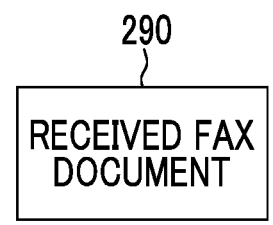
FIGS. 6A and 6B are diagrams for explaining the contents of a process by a certificate adding section.
Figure 6B:
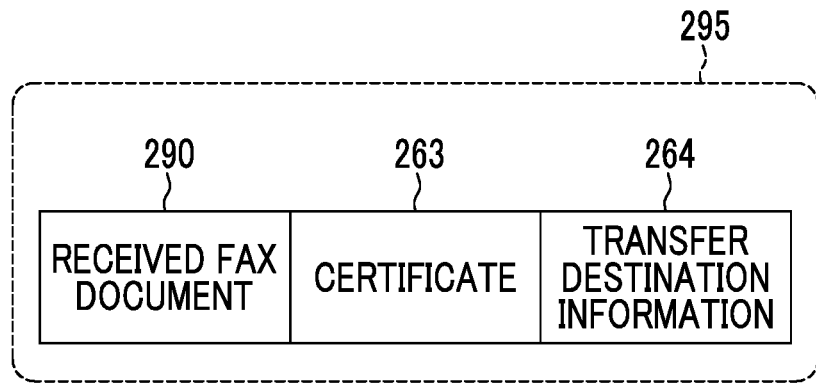

FIGS. 6A and 6B are diagrams for explaining the contents of a process by the certificate adding section 274. FIG. 6A illustrates the received FAX document 290 to be transmitted, and FIG. 6B illustrates an example of transmission data 295 generated by the certificate adding section 274.

As illustrated in FIGS. 6A and 6B, the transmission data 295 includes a corresponding certificate 263 and transfer destination information 264 in addition to the received FAX document 290. Here, the transmission data 295 is an example of the second data.

Here, the transfer destination information 264 is information for specifying a transfer destination described in the instruction form 262 (see FIG. 5). In the present exemplary embodiment, for example, the uniform resource locator (URL) of the cloud server is used as the transfer destination information 264.

Return to the description of FIG. 5.

The data transmission section 275 transmits the transmission data 295 (see FIGS. 6A and 6B) to the relay device 300 (see FIG. 1).

In a case where the transmission data 295 including the received FAX document 290 (see FIGS. 6A and 6B) is transmitted to the relay device 300, the log recording section 276 records the individual user of the confidential box 261 to which the received FAX document 290 is distributed, as the person who executes the transmission job. Specifically, the fact that the transmission of the received FAX document 290 to the relay device 300 (or the cloud server) is performed by the operation of a specific individual user is recorded as the job log 281.

Hardware Configuration of Relay Device 300

Figure 7:
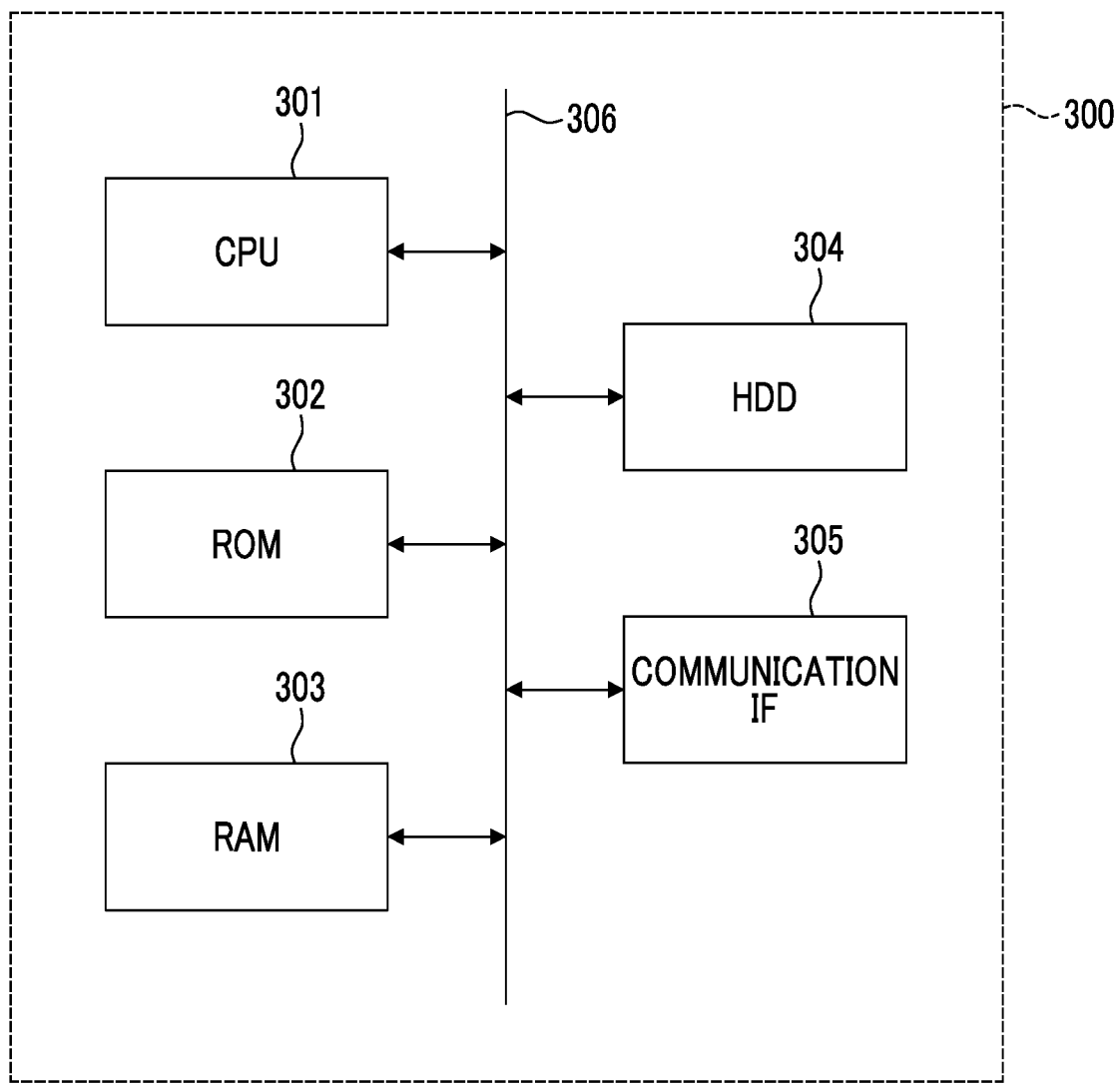
FIG. 7 is a diagram illustrating an example of a hardware configuration of a relay device according to Exemplary Embodiment 1.

FIG. 7 is a diagram illustrating an example of a hardware configuration of the relay device 300 according to Exemplary Embodiment 1.

The relay device 300 illustrated in FIG. 7 has a configuration of a so-called computer.

Therefore, the relay device 300 includes a CPU 301 that controls the entire device through execution of a program (including firmware), a ROM 302 that stores programs such as a basic input output system (BIOS) and an operation system (OS), a RAM 303 used as a program execution area, a hard disk device (HDD) 304 that stores image data, management data, and the like, and a communication interface (communication IF) 305 used for communication with the outside.

These sections are connected to each other through a bus 306, and data is exchanged through the bus 306.

Figure 8:
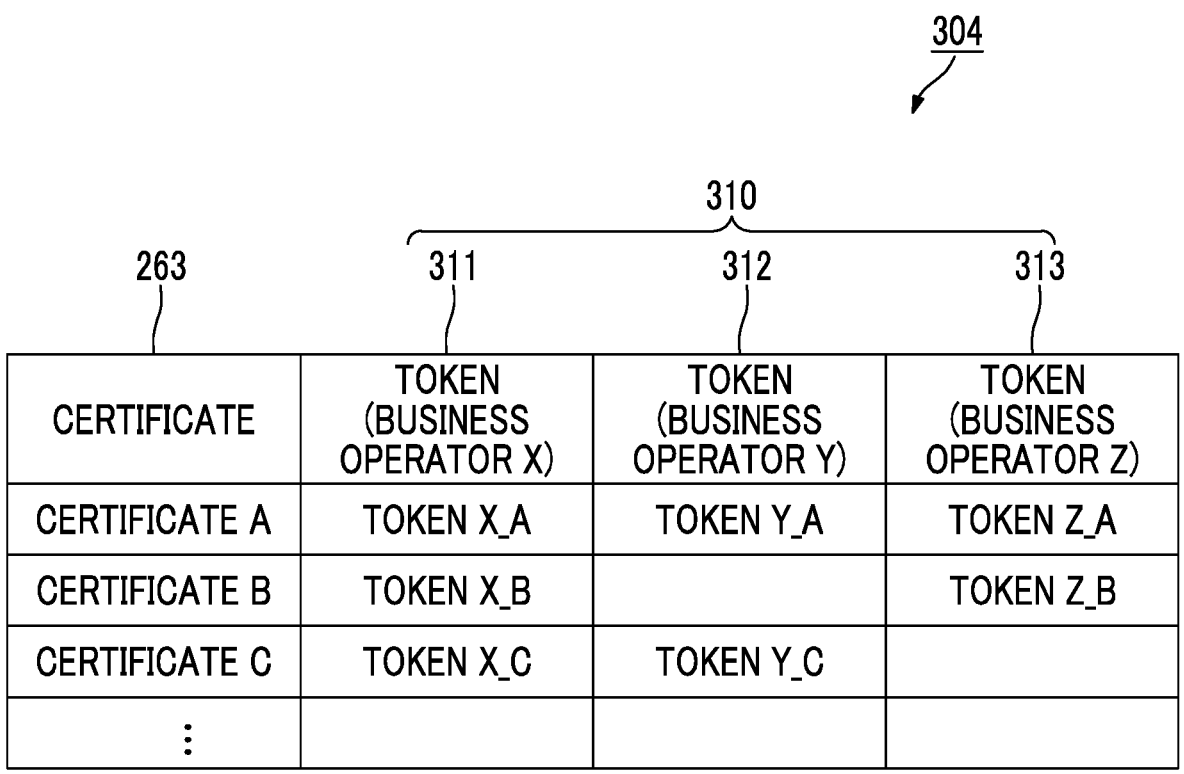
FIG. 8 is a diagram for explaining an example of a use of a storage area of a hard disk device constituting the relay device.

FIG. 8 is a diagram for explaining an example of a use of a storage area of the hard disk device 234 constituting the relay device 300 (see FIG. 7).

In the case of the present exemplary embodiment, information required for relaying the received FAX document 290 (see FIGS. 6A and 6B) is stored in a part of the storage area of the hard disk device 304.

Specifically, the certificate 263 associated with a specific user individual and the token 310 issued by the business operator operating the cloud server 700 are stored in a state of being associated with each other.

The token 310 is a meaningless character string that does not contain highly confidential information such as personal information and is issued in a case of using the cloud service.

The token 310 is used by a business operator that provides a cloud service (here, a business operator that operates the cloud server 700) to identify an individual.

In the case of FIG. 8, as the token 310, a token 311 previously issued by the business operator X to a specific individual user, a token 312 previously issued by the business operator Y to a specific individual user, and a token 313 previously issued by the business operator Z to a specific individual user are stored.

In the case of FIG. 8, the token X_A for the user A issued by the business operator X, the token Y_A for the user A issued by the business operator Y, and the token Z_A for the user A issued by the business operator Z are associated with the certificate A of the user A.

In the case of the user A, tokens have been acquired from all business operators assumed in the present exemplary embodiment, but the number of tokens that have been acquired and the business operators that have issued the tokens are different for each individual user.

For example, the token X_B for the user B issued by the business operator X and the token Z_B for the user B issued by the business operator Z are associated with the certificate B of the user B.

Further, for example, the token X_C for the user C issued by the business operator X and the token Y_C for the user C issued by the business operator Y are associated with the certificate C of the user C.

Functional Configuration of Relay Device 300

Figure 9:
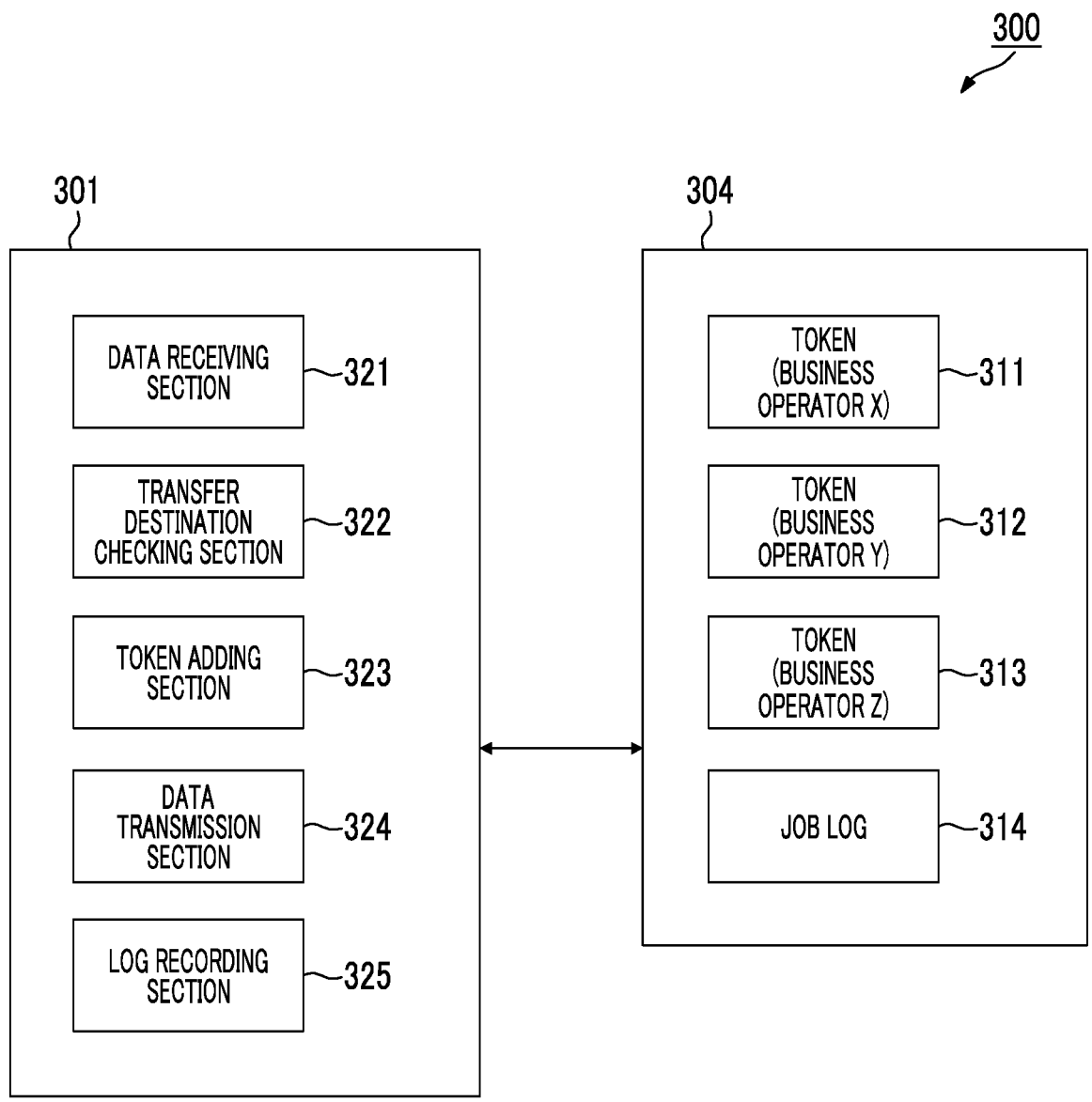
FIG. 9 is a diagram illustrating an example of a functional configuration of the relay device according to the exemplary embodiment.

FIG. 9 is a diagram illustrating an example of a functional configuration of the relay device 300 according to the exemplary embodiment.

The functions shown in FIG. 9 are realized by the CPU 301 executing a program.

In addition, FIG. 9 illustrates some functions necessary for cooperation with the image forming apparatus 200 (see FIG. 1) among the functions realized through the execution of the program.

The functions illustrated in FIG. 9 include a data receiving section 321 that receives data from the outside, a transfer destination checking section 322 that checks a transfer destination in a case where a transfer destination is designated in the received data, a token adding section 323 that adds a token corresponding to the provider of a service to the data to be transmitted, in a case where a transfer destination is a cloud service, a data transmission section 324 that transmits the transmission data with the token, and a log recording section 325 that records the transmission of data as an operation of the corresponding individual user.

In the case of the present exemplary embodiment, the data receiving section 321 receives transmission data 295 (see FIGS. 6A and 6B) including the received FAX document 290 (see FIGS. 6A and 6B) from the image forming apparatus 200, as contents.

Further, the transfer destination checking section 322 reads the transfer destination information 264 (see FIGS. 6A and 6B) included in the transmission data 295, and gives it to the token adding section 323.

The token adding section 323 reads the token 310 (see FIG. 8) corresponding to the individual user specified by the certificate 263 (FIGS. 6A and 6B) included in the transmission data 295, and adds it to the transmission data.

FIG. 10 are diagrams for explaining the contents of a process by the token adding section 323, a part (A) of FIG. 10 illustrates the transmission data 295 received by the relay device 300 (see FIG. 1), and a part (B) of FIG. 10 is an example of transmission data 330 generated by the token adding section 323.

The transmission data 330 is given by a structure in which a token 310 specified by an individual user and a transfer destination is added to the received FAX document 290 to be transferred.

Return to the description of FIG. 9.

The data transmission section 324 transmits the transmission data 330 (see FIG. 10) to the cloud server 700 (see FIG. 1) designated by the transfer destination information 264 (see FIG. 10).

In a case where the transmission data 330 including the received FAX document 290 (see FIG. 10) is transmitted to a specific cloud server 700, the log recording section 325 records the individual user specified by the certificate 263, as the person who executes the transmission job.

Specifically, the fact that the transmission of the received FAX document 290 to the cloud server is performed by the operation of a specific individual user is recorded as the job log 314.

Processing Operation of Information Processing System 400

Hereinafter, processing operations executed in the information processing system 400 (see FIG. 1) will be described separately for the processing operation of the image forming apparatus 200 and the processing operation of the relay device 300.

Processing Operation of Image Forming Apparatus 200

Figure 11:
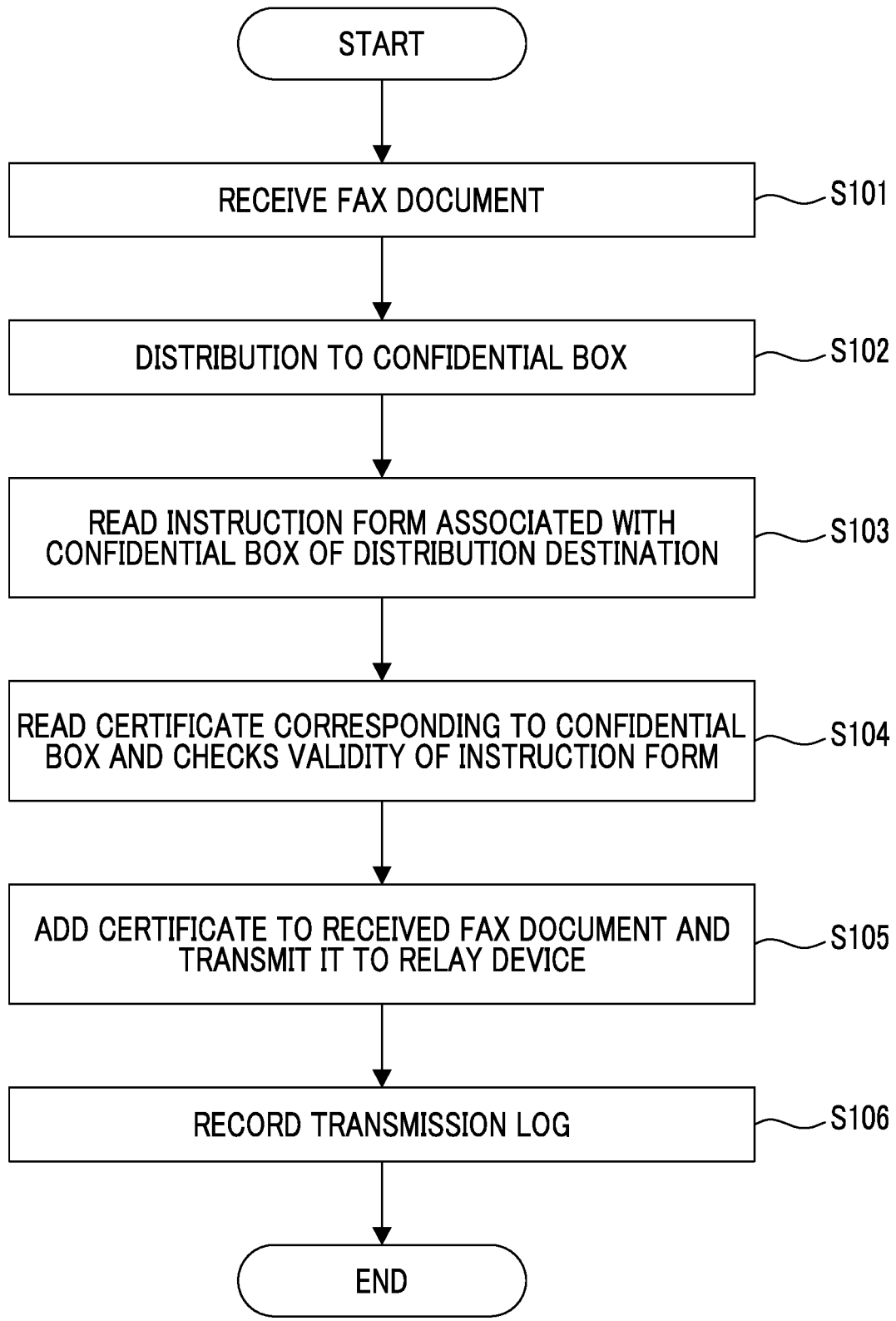
FIG. 11 is a flowchart illustrating a processing operation executed in a case where the image forming apparatus receives a FAX document.

FIG. 11 is a flowchart illustrating a processing operation executed in a case where the image forming apparatus 200 (see FIG. 1) receives a FAX document. The symbol S in FIG. 11 means a step.

First, the image forming apparatus 200 receives a FAX document (step S101). The reception of the FAX document does not require the operation of a person. That is, reception of a FAX document is executed in a state where there is no individual authentication.

Next, the image forming apparatus 200 distributes the received FAX document (reception FAX document) to the corresponding confidential box 261 (see FIG. 5) according to a predetermined rule (step S102).

Thereafter, the image forming apparatus 200 reads the instruction form 262 associated with the confidential box 261 of a distribution destination (step S103). In the instruction form 262, information on the transfer destination of the received FAX document 290 which is newly stored (see FIGS. 6A and 6B) is described.

Next, the image forming apparatus 200 reads the certificate 263 (see FIGS. 6A and 6B) corresponding to the confidential box 261 and checks the validity of the instruction form 262 (step S104).

The certificate 263 certifies that the instruction form 262 is created by a specific user. Therefore, even in a case where the illegally created instruction form 262 is read out, the validity is denied by the certificate 263.

The image forming apparatus 200 adds the certificate 263 to the received FAX document read from the confidential box 261 and transmits it to the relay device 300 (step S105). Transfer destination information 264 (see FIGS. 6A and 6B) is added to the received FAX document and the certificate 263.

The certificate 263 here is used for specifying the individual who owns the received FAX document 290 included in the transmission data 295 (see FIGS. 6A and 6B). In this sense, the certificate 263 is an example of information for specifying an individual.

Incidentally, examples of information used for specifying an individual include information for specifying an individual authorized to use the confidential box 261, that is, user information or a certificate of the owner of the confidential box 261.

Therefore, in a case of transferring data to the relay device 300, the image forming apparatus 200 according to the present exemplary embodiment transmits the received FAX document and the user information of the owner thereof.

Thereafter, the image forming apparatus 200 records transmission logs of the received FAX document 290 and the certificate 263 (step S106).

Processing Operation of Relay Device 300

Figure 12:
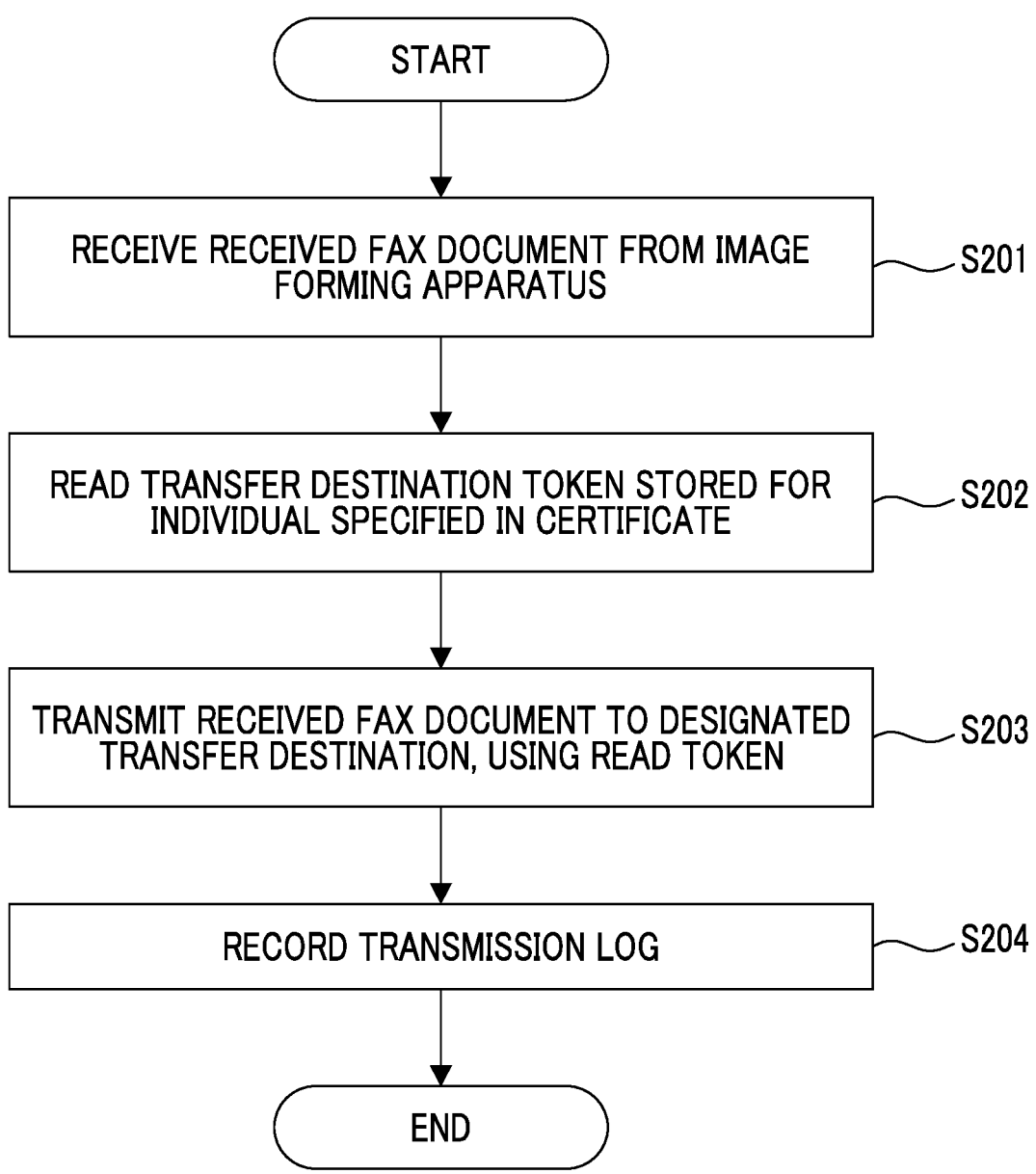
FIG. 12 is a flowchart illustrating a processing operation executed in a case where the relay device receives the received FAX document.

FIG. 12 is a flowchart for explaining a processing operation executed in a case where the relay device 300 (see FIG. 1) receives the received FAX document 290 (see FIG. 10). The symbol S in FIG. 12 means a step.

The relay device 300 receives the received FAX document 290 from the image forming apparatus 200 (see FIG. 1) (step S201). As described above, the certificate 263 (see FIG. 10) and the transfer destination information 264 (see FIG. 10) are attached to the received FAX document 290 herein.

Next, the relay device 300 reads the transfer destination token stored for the individual specified in the certificate 263 (step S202).

Thereafter, the relay device 300 transmits the received FAX document 290 to the designated transfer destination, using the read token (step S203).

Finally, the relay device 300 records the transmission log of the received FAX document 290 (step S204).

Specific Example of Processing Operation

Figure 13:
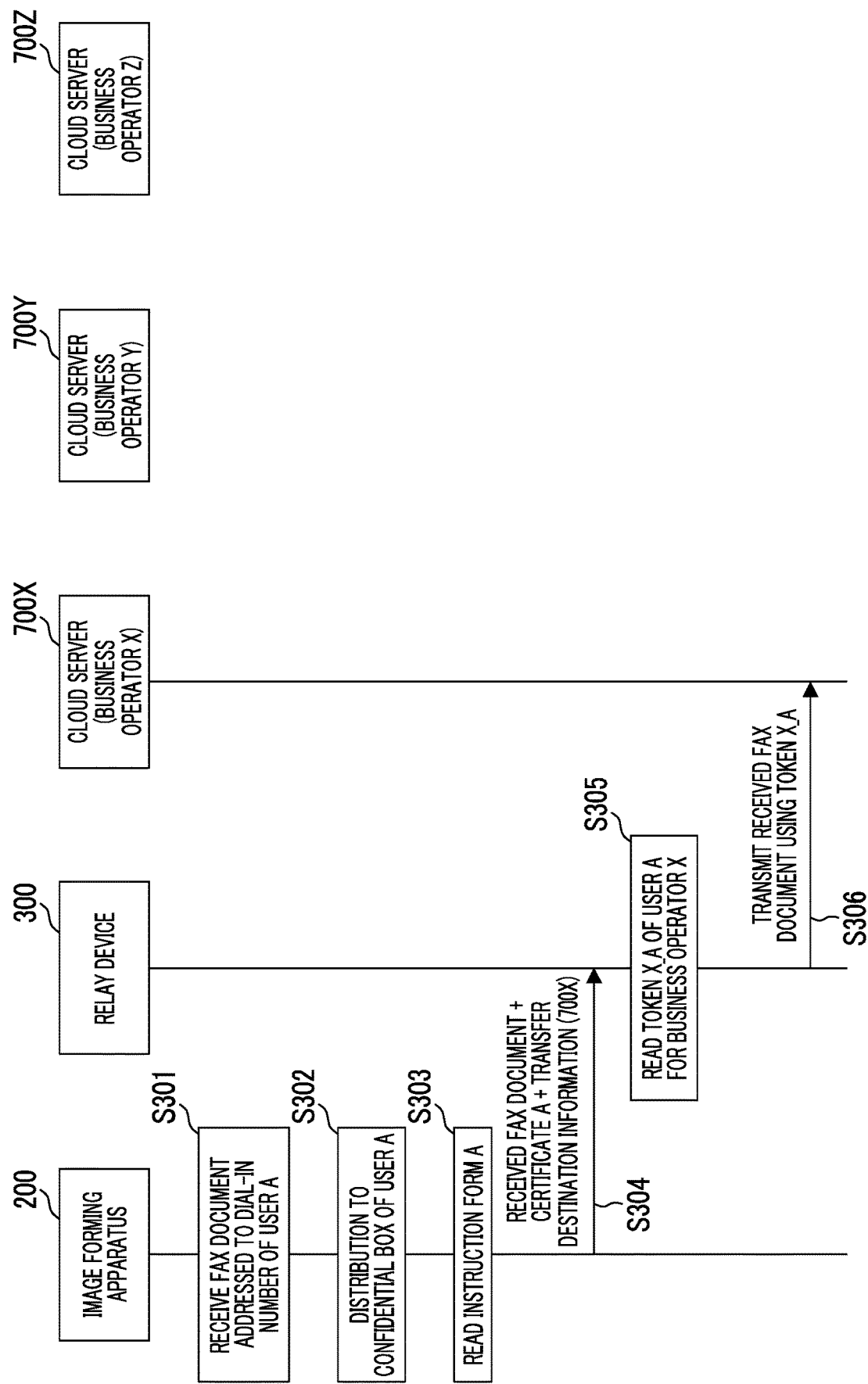
FIG. 13 is a diagram for explaining an example of a processing operation in a case where a FAX document addressed to a user A is received.

FIG. 13 is a diagram for explaining an example of a processing operation in a case where a FAX document addressed to the user A is received. The symbol S in FIG. 13 means a step.

First, the image forming apparatus 200 receives a FAX document addressed to the dial-in number of the user A (step S301).

The image forming apparatus 200 distributes the received FAX document to the confidential box 261A (see FIG. 5) of the user A, by using the dial-in number (step S302).

Next, the image forming apparatus 200 reads the instruction form 262A (see FIG. 5) associated with the confidential box 261A (step S303).

In the case of this example, a cloud server 700X of the business operator X is described as a transfer destination in the instruction form 262A.

Accordingly, the image forming apparatus 200 transmits the received FAX document 290, the certificate 263A, and the transfer destination information 264 (cloud server 700X) to the relay device 300 (step S304).

The relay device 300 reads the token X_A of the user A for the business operator X, based on the received certificate 263A (step S305), and transmits the received FAX document 290 to the cloud server 700X using the read token X_A (step S306).

Figure 14:
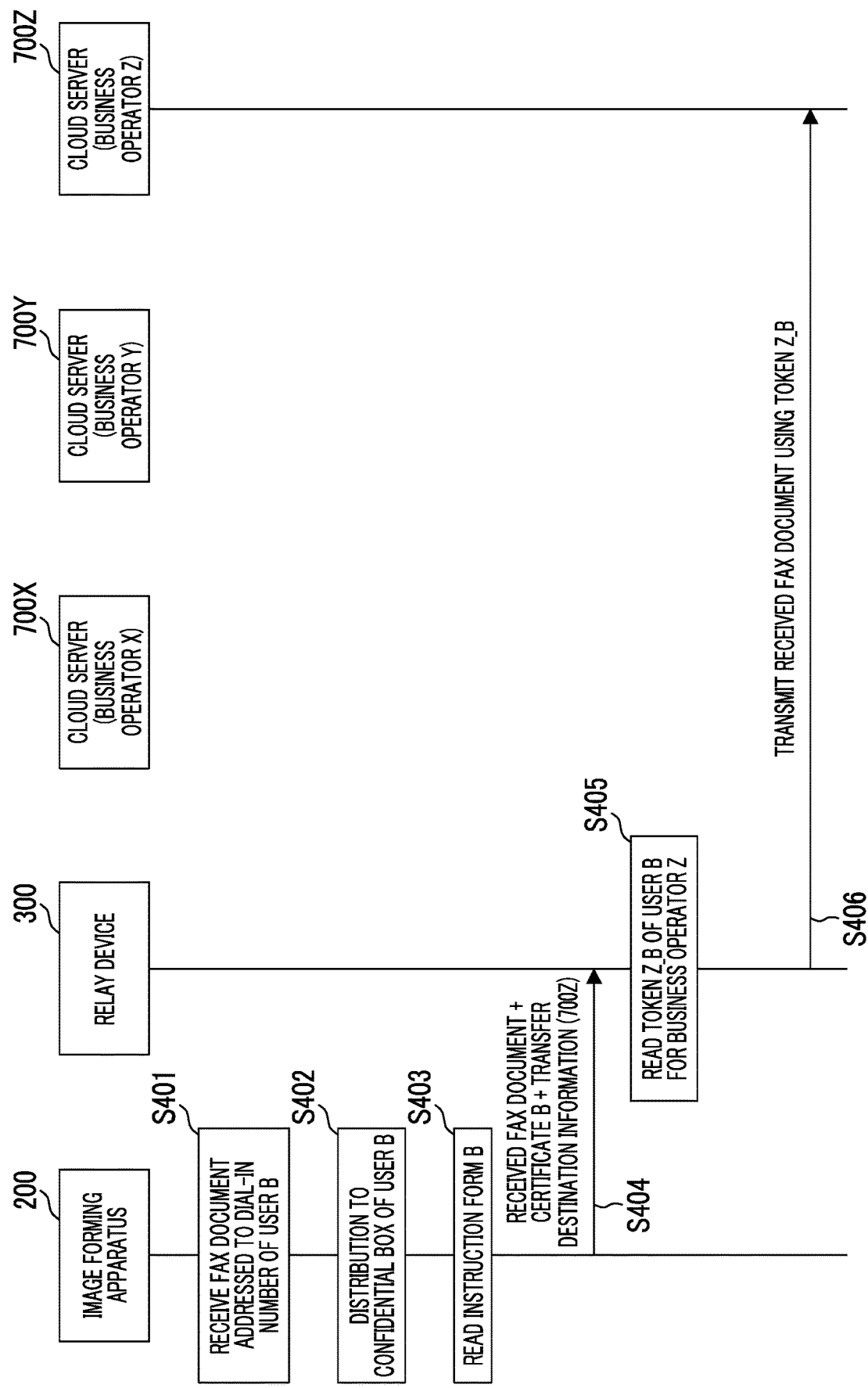
FIG. 14 is a diagram for explaining an example of a processing operation in a case where a FAX document addressed to a user B is received.

FIG. 14 is a diagram for explaining an example of a processing operation in a case where a FAX document addressed to the user B is received. The symbol S in FIG. 14 means a step.

First, the image forming apparatus 200 receives a FAX document addressed to the dial-in number of the user B (step S401).

The image forming apparatus 200 distributes the received FAX document to the confidential box 261B (see FIG. 5) of the user B, by using the dial-in number (step S402).

Next, the image forming apparatus 200 reads the instruction form 262B (see FIG. 5) associated with the confidential box 261B (step S403).

In the case of this example, a cloud server 700Z of the business operator Z is described as a transfer destination in the instruction form 262B.

Accordingly, the image forming apparatus 200 transmits the received FAX document 290, the certificate 263B, and the transfer destination information 264 (cloud server 700Z) to the relay device 300 (step S404).

The relay device 300 reads the token Z_B of the user B for the business operator Z, based on the received certificate 263B (step S405), and transmits the received FAX document 290 to the cloud server 700Z using the read token Z_B (step S406).

Figure 15:
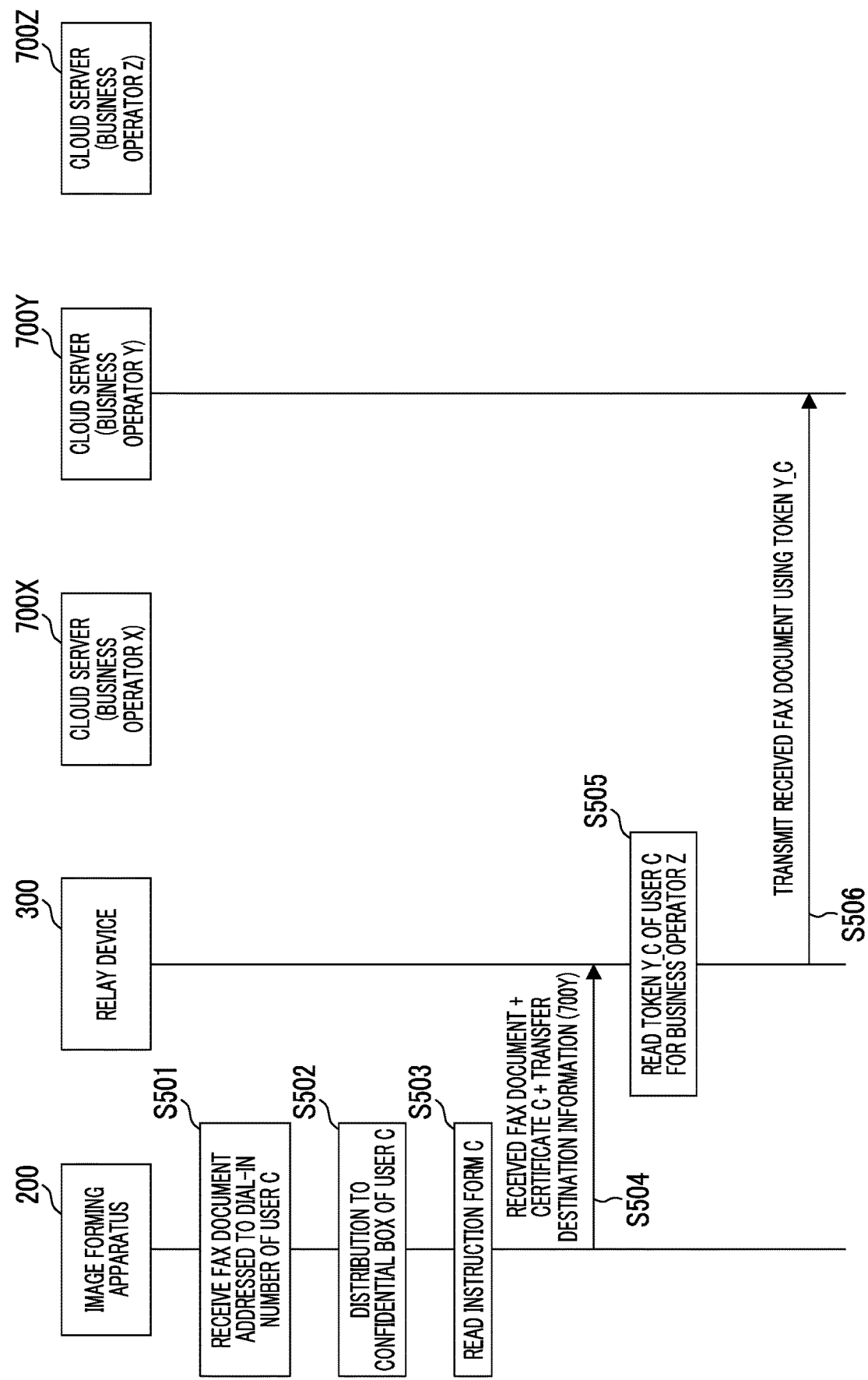
FIG. 15 is a diagram for explaining an example of a processing operation in a case where a FAX document addressed to a user C is received.

FIG. 15 is a diagram for explaining an example of a processing operation in a case where a FAX document addressed to the user C is received. The symbol S in FIG. 15 means a step.

First, the image forming apparatus 200 receives a FAX document addressed to the dial-in number of the user C (step S501).

The image forming apparatus 200 distributes the received FAX document to the confidential box 261C (see FIG. 5) of the user C, by using the dial-in number (step S502).

Next, the image forming apparatus 200 reads the instruction form 262C (see FIG. 5) associated with the confidential box 261C (step S503).

In the case of this example, a cloud server 700Y of the business operator Y is described as a transfer destination in the instruction form 262C.

Accordingly, the image forming apparatus 200 transmits the received FAX document, the certificate 263C, and the transfer destination information 264 (cloud server 700Y) to the relay device 300 (step S504).

The relay device 300 reads the token Y_C of the user C for the business operator Y, based on the received certificate 263C (step S505), and transmits the received FAX document 290 to the cloud server 700Y using the read token Y_C (step S506).

As described above, the FAX document received by the image forming apparatus 200 is transmitted together with information (that is, certificate 263 (see FIG. 5)) specifying the user corresponding to the confidential box 261 (see FIG. 5), which is the distribution destination, to the specific cloud server 700 (see FIG. 1) designated in the instruction form 262.

Figure 16:
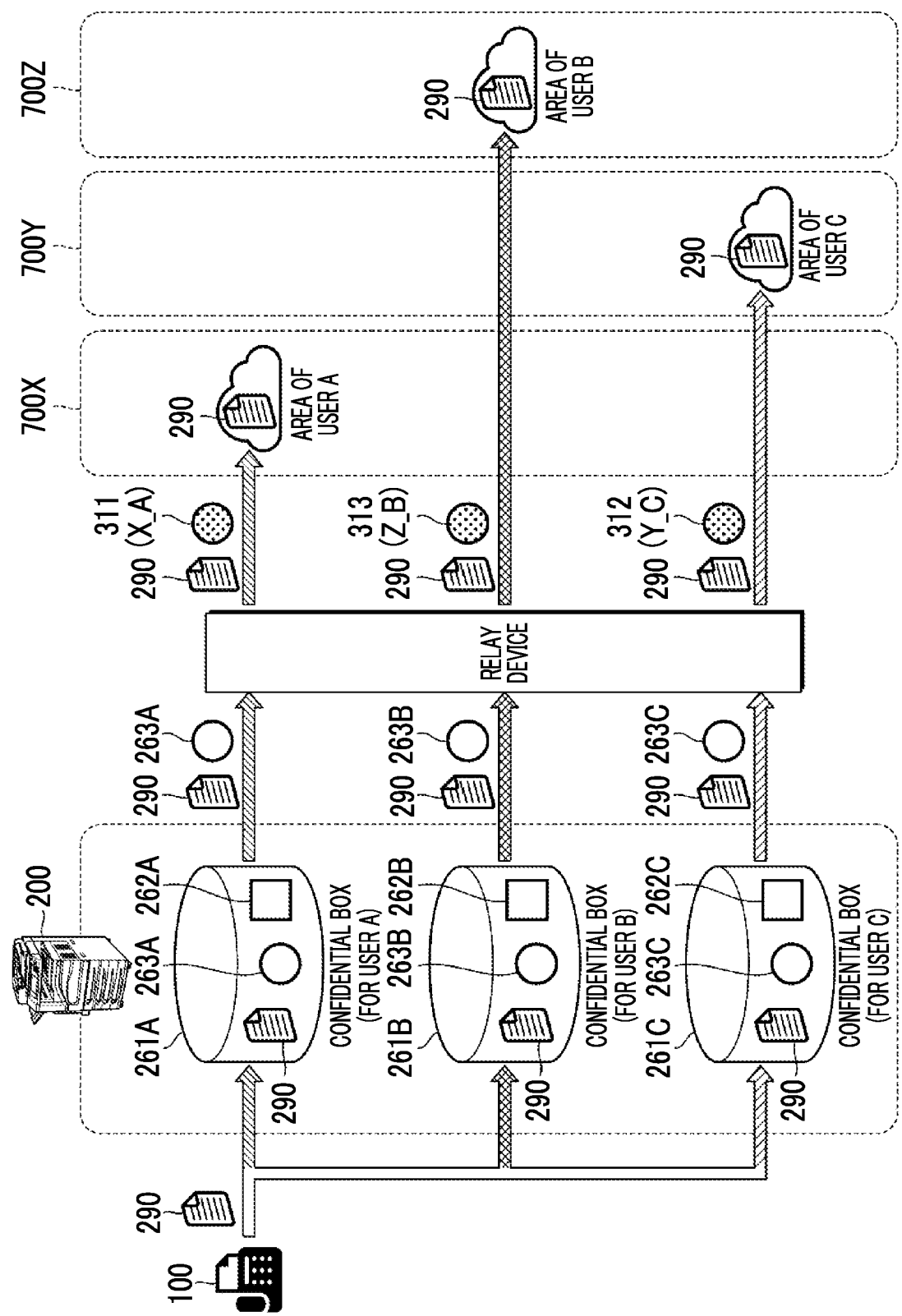
FIG. 16 is a diagram conceptually explaining the flow of a series of processes described in FIGS. 13 to 15.

FIG. 16 is a diagram conceptually explaining the flow of a series of processes described in FIGS. 13 to 15;

In FIG. 16, an aspect can be checked in which the received FAX document 290 is distributed to the user-specific confidential box 261 (261A to 261C), and thereafter the certificate 263 (263A to 263C) associated with the confidential box 261 (261A to 261C) is transmitted to the relay device 300.

Further, an aspect can be checked in which the relay device 300 uses the tokens 311 to 313 prepared for individuals specified by the certificates 263 (263A to 263C) to transfer the received FAX document 290 to the designated transfer destinations, respectively.

In FIG. 16, the received FAX document 290 is transmitted to the cloud server 700X by using the token X_A for the user A among the tokens 311 for the business operator X. In addition, the received FAX document 290 is transmitted to the cloud server 700Y by using the token Y_C for the user C among the tokens 312 for the business operator Y. In addition, the received FAX document 290 is transmitted to the cloud server 700Z by using the token Z_B for the user B among the tokens 313 for the business operator Z.

Exemplary Embodiment 2

System Configuration

Figure 17:
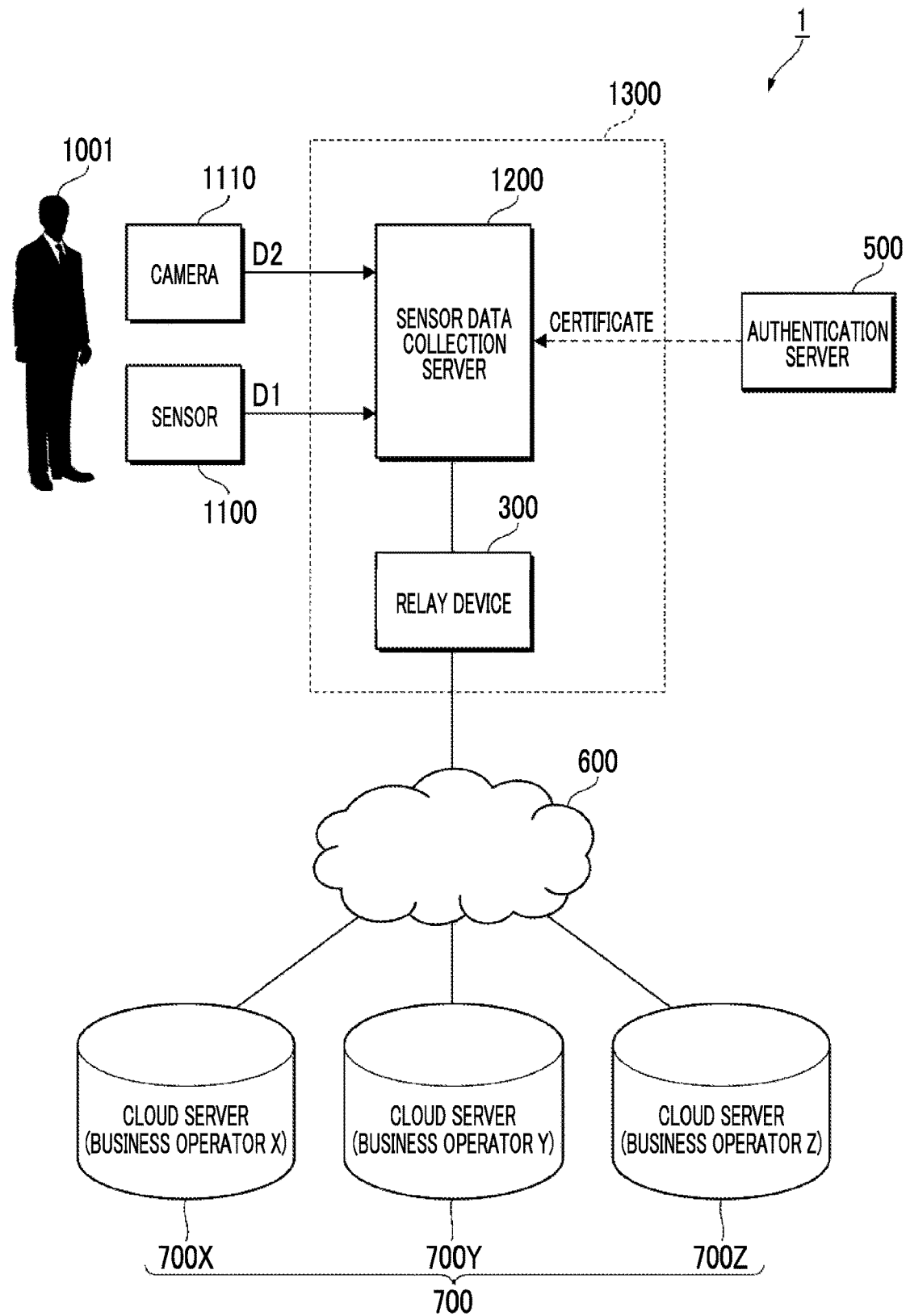
FIG. 17 is a diagram illustrating a configuration example of a cloud cooperation system according to Exemplary Embodiment 2.

FIG. 17 is a diagram illustrating a configuration example of a cloud cooperation system 1000 according to Exemplary Embodiment 2.

In FIG. 17, parts corresponding to those in FIG. 1 are denoted by the corresponding reference numerals.

In the present exemplary embodiment, sensor data which is output from the sensor 1100 is assumed as data generated in a state without individual authentication.

The sensor 1100 in the present exemplary embodiment outputs information detected or measured, as sensor data D1, regardless of the authentication of the individual 1001. For example, the sensor 1100 is set at a specific point and detects temperature, operation of home electric appliances, opening and closing of doors, passage of individuals 1001, and the like.

In the present exemplary embodiment, a face recognition technique is used for determining the distribution destination of the sensor data D1.

Therefore, in FIG. 17, a camera 1110 is prepared.

The sensor data collection server 1200 receives the sensor data D1 from the sensor 1100 and receives the image data D2 from the camera 1110.

The sensor data collection server 1200 according to the present exemplary embodiment has a function of specifying an individual as a subject of the image data D2 by a face recognition technique and distributing the sensor data D1 corresponding to the specified individual confidential box. In addition, a case of performing image recognition with a change in the sensor data D1 as a starting point and a case of receiving sensor data D1 at a corresponding time with the result of image recognition as a starting point are considered.

In the present exemplary embodiment, a system including the sensor data collection server 1200 and the relay device 300 is referred to as an information processing system 1300.

The sensor data collection server 1200 is an example of an information processing apparatus. In addition, the sensor data collection server 1200 also functions as an example of the adding unit constituting the information processing system 1300.

Figure 18:
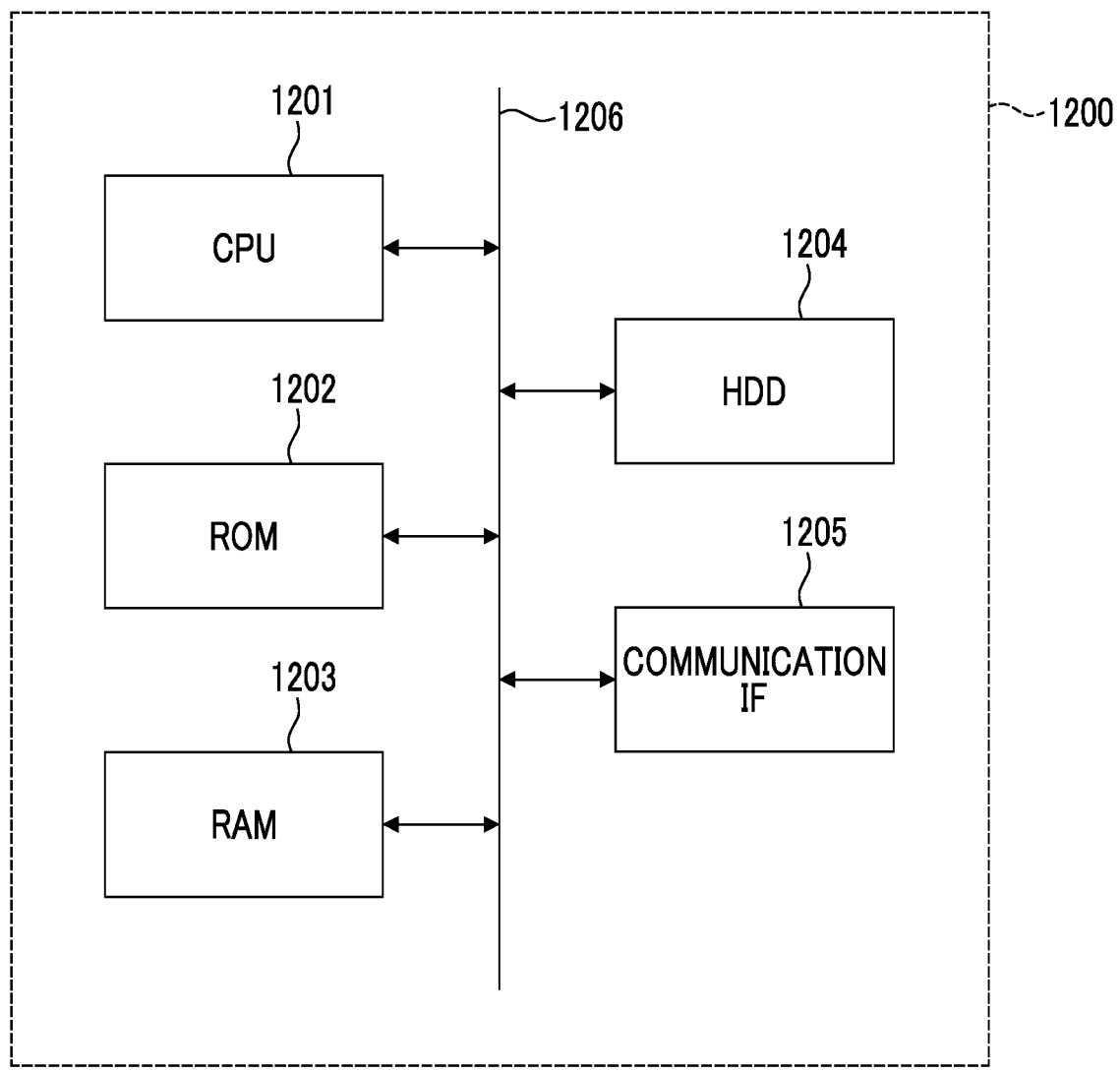
FIG. 18 is a diagram illustrating an example of a hardware configuration of a sensor data collection server according to Exemplary Embodiment 2.

FIG. 18 is a diagram illustrating an example of a hardware configuration of the sensor data collection server 1200 according to Exemplary Embodiment 2.

The sensor data collection server 1200 illustrated in FIG. 18 has a configuration of a so-called computer.

Therefore, the sensor data collection server 1200 includes a CPU 1201 that controls the entire device through execution of a program (including a basic program), a ROM 1202 that stores programs such as a BIOS and an operation system (OS), a RAM 1203 used as a program execution area, a hard disk device (HDD) 1204 that stores sensor data D1, image data D2, management data and the like, and a communication interface (communication IF) 1205 used for communication with the outside.

These sections are connected to each other through a bus 1206, and data is exchanged through the bus 1206.

Figure 19:
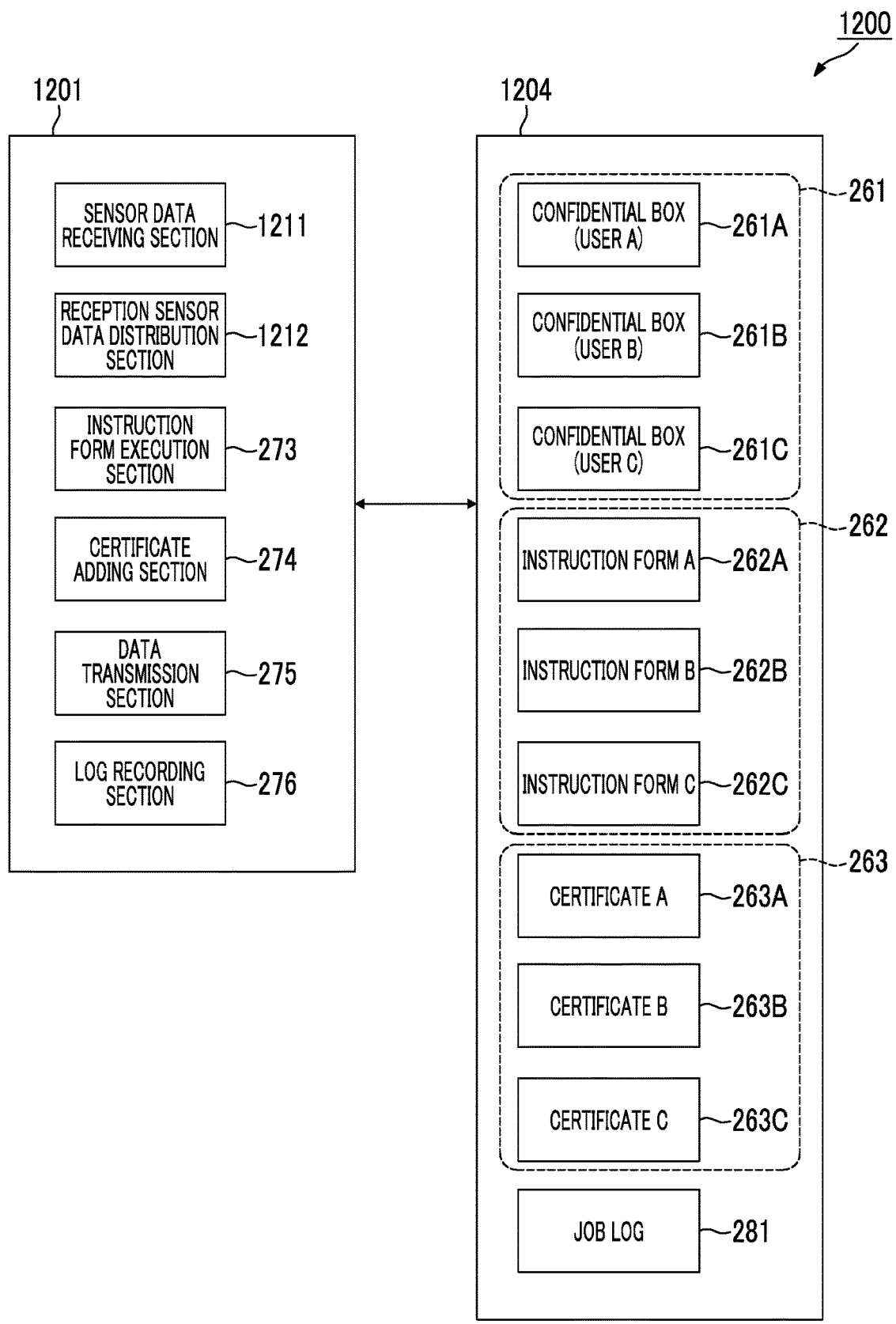
FIG. 19 is a diagram illustrating an example of a functional configuration of the sensor data collection server according to Exemplary Embodiment 2.

FIG. 19 is a diagram illustrating an example of a functional configuration of the sensor data collection server 1200 according to Exemplary Embodiment 2.

In FIG. 19, parts corresponding to those in FIG. 5 are denoted by the corresponding reference numerals.

The functions shown in FIG. 19 are realized by the CPU 1201 executing a program.

In addition, FIG. 19 illustrates some functions necessary for cooperation with the relay device 300 (see FIG. 17) among the functions realized through the execution of the program.

The functions illustrated in FIG. 19 are different from the functions illustrated in FIG. 5 in that a sensor data receiving section 1211 which receives the sensor data D1 and a reception sensor data distribution section 1212 which distributes the received sensor data D1 to the corresponding confidential box 261 (261A to 261C) are provided.

The face recognition technique described above is performed as a part of the function of the reception sensor data distribution section 1212. However, a mechanism may be used in which a processing section that processes the image data D2, recognizes the face of the subject, and specifies the individual 1001 independently is provided, and the result of face recognition is received at the reception sensor data distribution section 1212. In any case, in a case where an individual can be specified, the sensor data D1 corresponding to the confidential box 261 prepared for the specified individual 1001 is distributed.

For example, information on the temperature measured at a specific point is distributed to the corresponding individual confidential box 261.

Further, for example, the contents of the operation of the home appliance is distributed to the corresponding individual confidential box 261.

Further, for example, the occurrence of the door opening operation or the occurrence of the door closing operation is distributed to the corresponding individual confidential box 261.

Further, for example, the information on the date and time of passing through a specific point is distributed to the corresponding individual confidential box 261.

Since the processing operation after distribution to the confidential box 261 is the same as that in Exemplary Embodiment 1, its explanation will be omitted.

Both the confidential box 261, the instruction form 262, the certificate 263, and the job log 281 are stored in the hard disk device (HDD) 1204.

Other Exemplary Embodiments

Although the exemplary embodiments of the present invention have been described above, the technical scope of the present invention is not limited to the scope described in the above-described exemplary embodiment. It is obvious from the description of the scope of the claims that various modifications or improvements to the above-described exemplary embodiment are also included in the technical scope of the present invention.

For example, in the above-described exemplary embodiments, the image forming apparatus 200 and the relay device 300 are described as independent apparatuses, but the relay device 300 may be incorporated into the image forming apparatus 200.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
an adding unit that in a case where first data acquired in a state without individual authentication is stored in a storage area associated with a specific individual, adds information for specifying an individual to the first data to obtain second data; and
a transmission unit that only transmits the first data without the information for specifying an individual to a specific destination requiring individual authentication, using authentication information associated with the information for specifying an individual, which is acquired in advance from the specific destination.

2. The information processing system according to claim 1,
wherein the adding unit adds information on an individual authorized to use the storage area as the information for specifying an individual.

3. The information processing system according to claim 2,
wherein the first data is image data received from an outside.

4. The information processing system according to claim 3,
wherein the image data received from the outside is sorted based on a predetermined rule and stored in the storage area.

5. The information processing system according to claim 1,
wherein the first data is image data received from an outside.

6. The information processing system according to claim 5,
wherein the image data received from the outside is sorted based on a predetermined rule and stored in the storage area.

7. The information processing system according to claim 1,
wherein the information for specifying an individual is given in advance from an external device for each storage area.

8. The information processing system according to claim 7,
wherein the information for specifying an individual is generated by the external device, based on information on a specific individual associated with the storage area and information defining a process associated with the storage area.

9. The information processing system according to claim 1,
wherein the transmission unit records the transmission of the first data as a history of an operation of a specific individual associated with the storage area.

10. The information processing system according to claim 1,
wherein the specific destination is a memory area for each individual prepared on a cloud.

11. An information processing apparatus comprising:
an adding unit that in a case where image data received from an outside in a state without individual authentication is stored as first data in a storage area associated with a specific individual, adds information for specifying an individual to the first data to obtain second data; and
a transmission unit that transmits the second data to a relay device which relays communication to a specific destination requiring individual authentication,
wherein the relay device only transmits the first data without the information for specifying an individual to the specific destination.

12. The information processing apparatus according to claim 11,
wherein the information for specifying an individual is given in advance from an external device for each storage area.

13. The information processing apparatus according to claim 12,
wherein the information for specifying an individual is generated by the external device, based on information on a specific individual associated with the storage area and information defining a process associated with the storage area.

14. The information processing apparatus according to claim 11,
wherein the transmission unit records the transmission of the second data as a history of an operation of a specific individual associated with the storage area.

15. The information processing apparatus according to claim 11,
wherein the specific destination is a memory area for each individual prepared on a cloud.

16. A non-transitory computer readable medium storing a program causing a computer to function as:
an adding unit that in a case where first data acquired in a state without individual authentication is stored in a storage area associated with a specific individual, adds information for specifying an individual to the first data to obtain second data; and
a transmission unit that only transmits the first data without the information for specifying an individual to a specific destination requiring individual authentication, using authentication information associated with the information for specifying an individual, which is acquired in advance from the specific destination.

17. A non-transitory computer readable medium storing a program causing a computer to function as:
a transmission unit that in a case of receiving second data in which information for specifying an individual is added to first data acquired in a state without individual authentication, only transmits the first data without the information for specifying an individual to a specific destination requiring individual authentication, using authentication information associated with the information for specifying an individual, which is acquired in advance from the specific destination.

* * * * *